US010945289B2

(12) United States Patent
Leighton et al.

(10) Patent No.: US 10,945,289 B2
(45) Date of Patent: Mar. 9, 2021

(54) SYSTEM FOR COLLISION AVOIDANCE IN TRANSFER OF NETWORK PACKETS

(71) Applicant: Quest Technical Sales and Marketing, Inc., Westlake Village, CA (US)

(72) Inventors: John Leighton, Westlake Village, CA (US); Robert Baranowski, Valley Center, CA (US)

(73) Assignee: QTS HOLDINGS, LLC, Westlake Village, CA (US)

( * ) Notice: Subject to any disclaimer, the term of this patent is extended or adjusted under 35 U.S.C. 154(b) by 0 days.

(21) Appl. No.: 16/730,828

(22) Filed: Dec. 30, 2019

(65) Prior Publication Data
US 2020/0260493 A1    Aug. 13, 2020

Related U.S. Application Data

(63) Continuation of application No. 16/455,702, filed on Jun. 27, 2019.

(60) Provisional application No. 62/804,700, filed on Feb. 12, 2019.

(51) Int. Cl.
*H04W 74/08*    (2009.01)
*H04W 76/10*    (2018.01)
*H04W 84/12*    (2009.01)

(52) U.S. Cl.
CPC ....... *H04W 74/0816* (2013.01); *H04W 76/10* (2018.02); *H04W 84/12* (2013.01)

(58) Field of Classification Search
None
See application file for complete search history.

(56) References Cited

U.S. PATENT DOCUMENTS

| | | |
|---|---|---|
| 6,788,702 B1 | 9/2004 | Garcia-Luna-Aceves et al. |
| 6,850,512 B1 | 2/2005 | Bishop et al. |
| 7,013,162 B2 | 3/2006 | Gorsuch |
| 7,024,222 B2 | 4/2006 | Gorsuch |
| 7,352,772 B2 | 4/2008 | Cromer et al. |
| 7,756,058 B2 | 7/2010 | Cordeiro et al. |
| 8,160,001 B2 | 4/2012 | Bitran |
| 8,208,449 B2 | 6/2012 | Karaoguz et al. |
| 8,274,885 B2 | 9/2012 | Wu et al. |
| 8,416,743 B2 | 4/2013 | Kim et al. |
| 8,472,463 B1 | 6/2013 | Ji et al. |

(Continued)

OTHER PUBLICATIONS

US 9,426,725 B2, 08/2016, Kim et al. (withdrawn)

(Continued)

*Primary Examiner* — Phirin Sam
*Assistant Examiner* — Sori A Aga
(74) *Attorney, Agent, or Firm* — M.J. Ram and Associates (57) ABSTRACT

A system for transmitting data over a communication network operating in an Ethernet or serial communication mode, where an Ethernet or serial cable is replaced by radios transmitting over an over-the-air radio link. The system includes computer processors that receive the data and assemble that data into smaller OTA data packets for delivery across the link and operating protocols that provide collision avoidance of OTA packets transmitted in an overlapping manner by radios on opposite sides of the over-the-air link. In a preferred mode the system operates in the 902-928 MHz ISM band, and the data being transmitted over distances much greater than for 2.4 GHz transmission.

13 Claims, 7 Drawing Sheets

(56) References Cited

U.S. PATENT DOCUMENTS

| | | | |
|---|---|---|---|
| 8,509,173 B2 | 8/2013 | Kim et al. |
| 8,519,847 B2 | 8/2013 | Honkanen et al. |
| 8,565,203 B2 | 10/2013 | Ghosh |
| 8,583,129 B2 | 11/2013 | Kim et al. |
| 8,588,158 B2 | 11/2013 | Kim et al. |
| 8,588,160 B2 | 11/2013 | Kim et al. |
| 8,594,120 B2 | 11/2013 | Mangold et al. |
| 8,605,741 B2 | 12/2013 | Kim et al. |
| 8,694,000 B2 | 4/2014 | Bishop et al. |
| 8,730,990 B2 | 5/2014 | Ghosh et al. |
| 8,767,763 B2 | 7/2014 | Kim et al. |
| 8,792,466 B2 | 7/2014 | Kim et al. |
| 8,824,382 B2 | 9/2014 | Shu et al. |
| 8,824,435 B2 | 9/2014 | Seok et al. |
| 8,830,863 B2 | 9/2014 | Novak et al. |
| 8,855,708 B2 | 10/2014 | Bhat et al. |
| 8,880,086 B2 | 11/2014 | Lee et al. |
| 8,913,577 B2 | 12/2014 | Kim et al. |
| 8,929,933 B2 | 1/2015 | Tan et al. |
| 8,976,677 B2 | 3/2015 | Novak et al. |
| 8,989,155 B2 | 3/2015 | Forenza et al. |
| 9,049,686 B2 | 6/2015 | Kim et al. |
| 9,059,927 B2 | 6/2015 | Aparicio et al. |
| 9,078,196 B2 | 7/2015 | Kim et al. |
| 9,088,995 B2 | 7/2015 | Novak et al. |
| 9,100,937 B2 | 8/2015 | Seok et al. |
| 9,107,078 B2 | 8/2015 | Shellhammer et al. |
| 9,113,341 B2 | 8/2015 | Kim et al. |
| 9,118,450 B2 | 8/2015 | Kim et al. |
| 9,124,476 B2 | 9/2015 | Wu et al. |
| 9,144,088 B2 | 9/2015 | Seok |
| 9,185,707 B2 | 11/2015 | Lee et al. |
| 9,203,532 B2 | 12/2015 | Kim et al. |
| 9,215,599 B2 | 12/2015 | Kim et al. |
| 9,220,015 B2 | 12/2015 | Kim et al. |
| 9,226,163 B2 | 12/2015 | Kim et al. |
| 9,247,544 B2 | 1/2016 | Kim et al. |
| 9,247,568 B2 | 1/2016 | Ji et al. |
| 9,253,646 B2 | 2/2016 | Kim et al. |
| 9,258,833 B2 | 2/2016 | Bitran et al. |
| 9,282,557 B2 | 3/2016 | Gao et al. |
| 9,282,588 B2 | 3/2016 | Novak et al. |
| 9,286,788 B2 | 3/2016 | Kates |
| 9,288,682 B2 | 3/2016 | Hassan et al. |
| 9,332,556 B2 | 5/2016 | Bhat et al. |
| 9,363,824 B2 | 6/2016 | Jung et al. |
| 9,402,239 B2 | 7/2016 | Kim et al. |
| 9,439,186 B2 | 9/2016 | Lee et al. |
| 9,444,607 B2 | 9/2016 | Kim et al. |
| 9,479,450 B2 | 10/2016 | Moeller et al. |
| 9,491,756 B2 | 11/2016 | Gao et al. |
| 9,521,656 B2 | 12/2016 | Malkov et al. |
| 9,532,271 B2 | 12/2016 | Bishop et al. |
| 9,537,642 B2 | 1/2017 | Belghoul et al. |
| 9,544,839 B2 | 1/2017 | Kim et al. |
| 9,544,901 B2 | 1/2017 | Kim et al. |
| 9,549,326 B2 | 1/2017 | Wei et al. |
| 9,585,025 B2 | 2/2017 | Abraham et al. |
| 9,609,520 B2 | 3/2017 | Shellhammer et al. |
| 9,668,299 B2 | 5/2017 | Karaoguz et al. |
| 9,681,367 B2 | 6/2017 | Hassan et al. |
| 9,709,983 B2 | 7/2017 | Seydoux et al. |
| 9,756,655 B2 | 9/2017 | Kim et al. |
| 9,801,073 B2 | 10/2017 | Cordeiro et al. |
| 9,813,994 B2 | 11/2017 | Abraham et al. |
| 9,825,748 B2 | 11/2017 | Liang et al. |
| 9,839,033 B2 | 12/2017 | Gao et al. |
| 9,839,045 B2 | 12/2017 | Freda et al. |
| 9,853,797 B2 | 12/2017 | Tabet et al. |
| 9,894,652 B2 | 2/2018 | Seok |
| 9,918,313 B2 | 3/2018 | Tan et al. |
| 9,949,277 B1 | 4/2018 | Anand et al. |
| 10,014,904 B1 | 6/2018 | Anand et al. |
| 10,143,008 B2 | 11/2018 | Ji et al. |
| 10,206,223 B2 | 2/2019 | Belghoul et al. |
| 10,334,507 B2 | 6/2019 | Hassan et al. |
| 2005/0064866 A1 | 3/2005 | Sun et al. |
| 2007/0147486 A1* | 6/2007 | Labs ................... H03D 7/16 375/222 |
| 2007/0153726 A1* | 7/2007 | Bar-Sade ............ H04L 1/0025 370/329 |
| 2007/0202867 A1 | 8/2007 | Waltho et al. |
| 2010/0272316 A1 | 10/2010 | Tayob et al. |
| 2012/0057536 A1 | 3/2012 | Verma et al. |
| 2012/0093078 A1 | 4/2012 | Perlman et al. |
| 2012/0314681 A1 | 12/2012 | Chen et al. |
| 2013/0012138 A1 | 1/2013 | Zhang et al. |
| 2013/0044681 A1 | 2/2013 | Abraham et al. |
| 2014/0086212 A1 | 3/2014 | Kafle et al. |
| 2015/0341199 A1 | 11/2015 | Wu et al. |
| 2016/0112518 A1* | 4/2016 | Haleem ................ H04L 67/12 713/168 |
| 2016/0353508 A1 | 12/2016 | Gorsuch |
| 2017/0135050 A1 | 5/2017 | Abraham et al. |
| 2017/0290058 A1 | 10/2017 | Singh et al. |
| 2018/0092108 A1 | 3/2018 | Freda et al. |
| 2018/0123758 A1 | 5/2018 | Lee et al. |
| 2018/0262393 A1* | 9/2018 | Xu ........................ H04L 12/64 |
| 2018/0316467 A1 | 11/2018 | Zhu et al. |
| 2019/0007185 A1 | 1/2019 | Cao et al. |

OTHER PUBLICATIONS

US 10,149,315 B2, 12/2018, Belghoul et al. (withdrawn)

Moore Industries: "Wireless Network Module WNM Installation Manual Moore Industries", May 1, 2016 (Year: 2016).*

International Search Report and Written Opinion in International Application No. PCT/US2020/017712 dated May 13, 2020.

Moore Industries: "Wireless Network Module WNM Installation Manual Moore Industries", May 1, 2016.

* cited by examiner

SYSTEM FOR COLLISION AVOIDANCE IN TRANSFER OF NETWORK PACKETS

This application is a Continuation application of U.S. application Ser. No. 16/455,702 filed Jun. 27, 2019, which claims benefit of Provisional Application 62/804,700 filed Feb. 12, 2019 entitled COLLISION AVOIDANCE FOR NETWORK PACKETS, the content thereof incorporated herein in its entirety by reference.

BACKGROUND

The problem of eliminating an Ethernet cable between devices or a device and the Internet and replacing that wired connection by a wirelessly connection was solved many years ago. Protocols were established to allow many devices to connect wirelessly to a single access point, and wireless bandwidth speeds have increased dramatically. Based on the 802.11 protocols, wireless Ethernet, or WiFi, has become a standard means of connecting various different electronic devices including, but not limited to, household appliances, lighting systems and security devices, to provide connectivity from anywhere.

The 802.11 protocols also include bridge protocols for connecting two wired networks together. This consists of two access points connected directly with each other, with one of the access points acting as a gateway for all of the devices on its wired or wireless local area network (WLAN) and providing connection to the Internet through the other access point that has a direct connection to the outside world. However, these systems have range limitations.

As 802.11 data rates increase, greater spectral bandwidth is utilized, using more complex modulation schemes. These advanced modulation schemes provide higher data density within the spectrum. However, as the schemes become more advanced, they still fundamentally require a specific amount of bandwidth and energy to transmit a bit of data, regardless of the data rate. This energy per bit, or $E_b/N_0$, is the physical limitation of how far a wireless signal can reach. The more energy a transmitter puts into transmitting a single bit, the further distance it can transmit this bit.

Typically, as data rates increase the $E_b/N_0$ decreases because there is less time to transmit a bit of data as the next bit of data is coming in right behind it. Advanced modulation schemes may provide better $E_b/N_0$ values, but the overriding limitation is bandwidth and transmit power. If transmit power is increased, the amount of energy used to transmit each bit increases. If the bandwidth is increased and the transmission of the bit is spread across a wider spectrum, the amount of energy used to transmit each bit increases. However, the FCC and other agencies around the world regulate what can be transmitted, and put limits on both bandwidth and transmit power.

Therefore, if a device needs to transmit data over a longer distance (i.e., have an increased range) since its output power and bandwidth is limited by regulating agencies, the only way to increase range is to decrease the data rate, which increases the $E_b/N_0$ if transmit power and bandwidth are kept constant. A different principle, but an extension of this concept, is to reduce the data rate AND bandwidth. On the receiving side, if a receiver is designed to receive a very narrow signal, it can employ a very narrow filter that rejects all other noise including thermal noise. The sensitivity of a receiver is based upon how high that signal is above the noise floor, or C/N ratio. The necessary C/N ratio is a function of the modulation, but the noise level, or N in the C/N ratio, is a function of the bandwidth that the receiver is seeing. The wider the bandwidth, the higher the thermal noise floor, as defined by the equation $10 \times \log 10(k \times T \times B)$ where:
k=Boltzmann's constant
T=Temperature
B=Bandwidth of the receiving filter Therefore, the higher the bandwidth, the less sensitive the receiver is, and the shorter the range of the link, given a constant transmit power level and modulation scheme.

More complicated modulation schemes can be employed that provide processing gain to extract signals from and below the noise floor, but these schemes typically lower the effective data rate and complicate the implementations on both the transmitting and receiving sides, adding size, weight, power, and cost to the implementation.

In light of the various regulatory and functional limitations, if the range that a link can achieve is to be increased dramatically, the only practical option is to lower the data rate. This is contrary to the current development of WiFi protocols where higher bandwidths at the same or possibly less range are preferred.

While there is support in the WiFi protocol for lowering data rates for a longer range link, even the lowest data rates use a spreading into a wider bandwidth of at least 5 MHz which is not as spectrally efficient as other modulations. With a lowest data rate of 1 Mbps, the rate is still higher than some small connected devices really need. In addition, the 802.11 protocol adds significant protocol overhead that affects the actual data rate throughput. While this is not as significant as data rates increase, it becomes more noticeable, and detrimental to data transfer, as the over air (wireless) data rates decrease.

Despite the wide adoption of WiFi and the high volume seen in typical WiFi components, WiFi links typically have higher costs because of 1) complexity of the modulation scheme that requires additional silicon (in chips) to implement, 2) additional memory and CPU energy is needed to run the WiFi and TCP/IP networking protocols, and 3) more expensive RF front ends and antenna schemes are required to try to increase range despite the transmitting power and bandwidth limitations.

Therefore, there is a need to provide an alternate wireless link that has a higher range than what is available with current implementation of the 802.11 protocol for use in connecting lower speed Ethernet devices. Specifically, there is a need for a wireless Ethernet bridge or cable replacement links that provide the capability of operating at very long ranges, such as miles as compared to a few hundred feet.

SUMMARY

It is an object of the system disclosed herein to address the above-described problems as well as other issues arising in attempting to provide long range wireless communication between transmitting and receiving devices. Specifically, it is an object of the embodiments set forth herein to provide a long-range wireless link for a low bandwidth Ethernet device without adding overhead data that consumes the available wireless bandwidth.

Additional objects, advantages and novel features of the disclosed system are set forth in the following detailed description and will be understood by those skilled in the art upon reading the following description and/or implementing the disclosed embodiments.

To achieve these stated and other objects, the preferred embodiment is a paired narrow band transmitter and receiver (a transceiver pair) that obtains its long range by employing a low data rate and a narrow bandwidth. This transceiver pair connects directly to the Ethernet and serves as a cable replacement, wirelessly and directly connecting two Ethernet ports. The described system also has the capability to receive and respond to devices referred to as personal assistants such as Google Home or Assistant and Apple's Siri or HomePod, Amazons Echo or Alexa and other voice activated communication and control devices.

In a most preferred embodiment to obtain greater range the transceiver pair for deployment in the United States and North American will operate in the 902-928 MHz ISM band. The preferred embodiment also includes algorithms and protocols to prevent collision of data transmitted between the transmitting and receiving components of the transceiver pair. The system can also sense how it is wired and will run the appropriate software to use to support either Ethernet or RS485 serial data.

BRIEF DESCRIPTION OF THE DRAWINGS

The accompanying drawings illustrate embodiments incorporating features of the present invention and are a part of the specification. Together with the following description, the drawings demonstrate and explain the principles of the embodiments incorporating features of the invention.

DETAILED DESCRIPTION

The system described herein eliminates an Ethernet cable or a serial cable between devices or a device and the Internet and replaces that wired cable connection by a wireless connection while at the same time providing the capability for the devices to communicate over a much greater distance (i.e., long range communication) without compromising the quality of the data transmitted.

The description below primarily addresses the replacement of an Ethernet cable but, as discussed below, is applicable, based on the teachings herein, to the replacement of serial cables or other hard-wired connections. Preferred embodiments include a paired narrow band transmitter and receiver (a transceiver pair) that obtains its long range by employing a low data rate and a narrow bandwidth. The transceiver pair connects directly to the Ethernet and serves as a cable replacement, wirelessly and directly connecting two Ethernet ports that could be connected with a hard-wired Ethernet cable. Additionally, to obtain greater range, the transceiver pair operates in the UHF 9 range (300-3,000 MHz). Preferably, for deployment in the United States and North American, the system operates in the 902-928 MHz ISM band, a range that the regulatory agencies including the FCC allow, providing higher transmission power than in the 2.4 GHz and 5 GHz bands used in current WiFi systems. To reduce the implementation cost, the transceiver pair is a dedicated point to point link that shuffles Ethernet packets from one side of the link to the other, eliminating the need to run a TCP/IP stack and the ability to dynamically add and remove connections. The system is designed to require very little overhead, which means that very small amounts of header information are required to send data over-the-air (wirelessly).

The combination of these elements produces a link that has a much longer range (1-20 miles) than WiFi links at a less expensive implementation cost at data rates that are more suited for small Internet devices. Generally, home networking Wi-Fi routers operating in the 2.4 GHz band reach up to 150 feet (46 m) indoors and 300 feet (92 m) outdoors. 802.11a routers operating on 5 GHz bands reached approximately 50-100 feet. Because the systems disclosed serve as an Ethernet cable replacement, devices using the link still have the advantages of an Ethernet connection even though operating at a lower throughput rate.

WiFi modulation is a wideband modulation that involves spreading over a wide channel to create a larger occupied bandwidth, which is more tolerant to interfering signals. On the demodulation side, it uses processing gain to get back some of the lost receiver sensitivity due to using a wide channel. Despite being usable in the presence of interferers, the 2.4 GHz band is becoming very crowded due to the amount of WiFi that is currently being deployed. The 5 GHz band is a bit better, but is also becoming more crowded as time goes on.

The preferred embodiments disclosed herein use the 902-928 MHz ISM band. However, persons skilled in the art will recognize, based on the teachings herein, that other frequency bands (such as 863-870 SRD band) can be used and are functionally equivalent to what is described herein. In the 902-928 MHz ISM band, to transmit maximum power the modulation scheme either needs to spread digitally or frequency hop. Since the intent is narrow band implementation, frequency hopping is the preferred embodiment. Frequency hopping also provides for interference avoidance, because if a hop lands on the same frequency as an interferer, the next hop will typically land somewhere differently than that interferer.

The link is designed to replace a hard-wired cable, so radios in communication will always connect in pairs and will ignore transmissions from other radios. In a preferred embodiment, pairs are defined at the time of production by assigning a unique ID number to the paired radios. An alternate embodiment allows two radios to be paired dynamically by initiating a pairing sequence with the pressing of a button or other similar procedure. The unique ID is transmitted with each packet and is used by a receiving radio to decide if the packet should be processed or not.

Along with the paired radio scheme and the selection of frequency hopping for the 902-928 MHz band, a preferred embodiment employs a master-slave arrangement, where the master maintains the hop sequence and the slave synchronizes its time base to the master's time base. Upon power-up, the master (or sending radio 104) begins at the beginning of its hop sequence. When the slave (the receiving radio 105) powers up, it transmits requests to the master and uses the responses to adjust its hop sequence to align with that of the master. A preferred hop sequence consists of 50 distinct channels, which is greater than what is required by the FCC to transmit at the highest power level. A channel within the band is a very narrow frequency slice within that band. In a preferred embodiment, channels are just under 500 kHz wide and are spaced 500 kHz apart. The hop units dwell at each channel for about 400 mS and completes the entire 50 channel hop sequence in about 20 seconds. Packets that the master sends include the transmit time of the packet, expressed relative to the start of the hop. This allows the slave to know where the master is in time and to adjust its own time base to line up with the master's time base. Immediately following each hop, the master sends out an additional timing packet that can be used by the slave to further adjust its time base, even when regular payload data is not being sent.

To ensure receipt of each packet transmitted, all payload packets in the system are acknowledged by the receiver. This acknowledgement (Herein after "ACK") consists of a very short packet that includes the unique ID of the radio pair. If the ACK from the receiver end is not received by the transmitter, the previous packet is retransmitted. To reduce the retransmit time in the case of just a single occasional bit error, large Ethernet packets are broken apart into smaller over-the-air (OTA) packets which take less time to retransmit in the case of an error. However, sending several smaller OTA packets adds overhead as each packet needs to have its own packet header, meaning the packet header is retransmitted for each OTA packet. The tradeoff between more overhead of smaller packets and longer retransmit times for packets with errors was adjusted by adjusting the OTA packet size to obtain an optimal packet size.

A preferred embodiment also contains a mechanism for avoiding collisions when both sides have data to transmit across the Ethernet link. Ethernet data by nature is asynchronous, which means that packets can arrive at any point in time without synchronization with the other side. But in the wireless scenario, if both the master and the slave receive an Ethernet packet to transmit over-the-air at the same time, and if they both actually transmit their packets at the same time, neither side will be able to get their packets through. This is because the radio implementation is half duplex which means that the radio can either be transmitting or receiving, but it cannot do both at the same time. Therefore, if both radios are transmitting, no data will be able to get across the wireless gap; this condition is referred to as a collision. The radio implementation can be changed to provide for full duplex operation, but this adds cost and requires additional room for implementation.

The OTA collisions are prevented in a preferred embodiment by having dedicated packet start times within the hop sequence that are different for both sides (i.e., as illustrated below are different for the master and slave). The implementation is such that when one side's packet start time arrives, the other side is known to be in receive mode and will not be attempting to transmit its own packet. There are many dedicated packet start times within the hop sequence, so that the second radio does not need to wait too long to start sending the packet it has ready to be sent.

This scheme was been proven to be functional under normal conditions (i.e., packets sent are received). However, if a first packet sent at the scheduled packet start time does not get across the air gap, for example because of RF conditions or other interferences, the other side might not know that the first side is already sending, and it might start sending its own packet. Therefore, to further reduce the chance of collisions, the first packet sent at the packet start time is a smaller packet sized to be completed by the time the other side's packet start time arrives. With this scheme, one side will send the first shorter packet then switch to receive mode and listen for either an ACK from the other side or the first packet the other side sends at its packet start time. If an ACK is received, then both sides are aware that the first side is in the sending mode and communication proceeds. If an ACK is not received and instead a first packet is received from the other side, the first side knows that its packet did not make it across and queues its packet and proceeds to receive the packets from the other side.

The dedicated packet start times also lends itself well to power saving schemes. The preferred embodiment is line powered and not battery powered and therefore power saving is not a priority. However, for battery powered embodiments, the receiver on each side can be powered on during the other side's packet start time and can quickly power down if a packet is not being received. This will allow the receiver to go into a low power sleep mode until the next packet start time, allowing power savings when it is known that there will be no data to receive.

With implementation of the disclosed embodiments using a much lower over-the-air data rate than for data transmitted using the Ethernet cable there will be packet loss if data on the Ethernet is running at full speed capacity, simply because of the differences in data rates. To reduce the impact of the lost packets, the system examines packet data to determine if each packet is primary data communication or just Ethernet background data. If a packet is an Ethernet background packet, and if the volume of Ethernet packets is high, the system will drop the background packets to save the available bandwidth for primary data communication packets. If necessary, the system can use more sophisticated Ethernet filtering schemes to save the limited over-the-air bandwidth for higher priority Ethernet packets.

Based on the description herein, it will be evident to those skilled in the art that variations in implementation of these schemes can be better for particular protocols, bands, and bandwidths, but are still included within the overall principles described as being within the scope of the invention.

With reference to the figures, an explanation of preferred embodiments of the present invention are explained.

Figure 1:
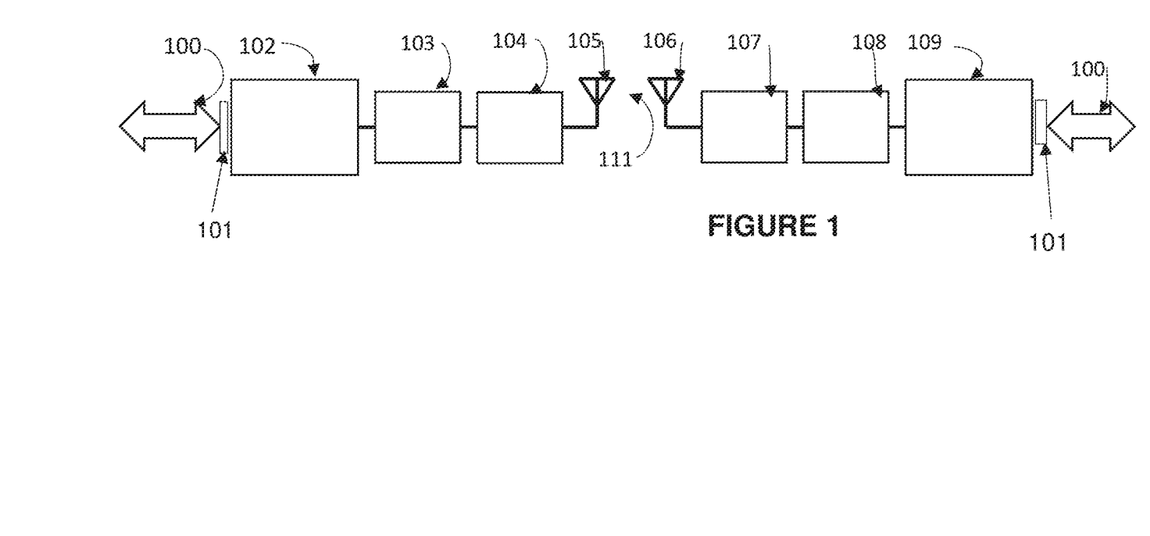
FIG. 1 is a block diagram of a preferred embodiment showing replacement of an Ethernet cable with a wireless system incorporating features of the invention.

FIG. 1 is a block diagram of a preferred embodiment incorporating features of the of the present invention showing a space 111 replacing an Ethernet cable, the space 111 representing a wireless, air communication link between a first radio 104 and second radio 107, also referred to as radio transceivers, in combination comprising a radio pair. While the radio pair is a combination of one master radio and one slave radio, the architecture and structure of each of the master and slave are identical and each of the first and second radios 104, 107 functioning as both a master and a slave. Determination of which of the first and second radios 104, 107 is the master and which is slave can be determined by firmware loaded into each side, by a switch or jumper setting in each unit, or by a dynamic determination that is done between the units before synchronizing.

In FIG. 1, the Ethernet 100 is connected to a first unit through an Ethernet connector 101 and is interfaced to a standalone first Ethernet controller 102. The first Ethernet controller 102 is referred to as standalone if it can do some basic Ethernet PHY interfacing without support from a microprocessor, such as framing, error detection, MAC address filtering, and similar low-level Ethernet functions. A standalone Ethernet controller 102 is used in the preferred embodiment, but is not a necessary requirement of the system.

The first CPU 103 (or first microcontroller) interfaces to the first Ethernet controller 102 and transfers Ethernet data packets between itself and the first Ethernet controller 102. The first CPU 103 can make the determination if the Ethernet packet should be transferred over-the-air to the other (second) unit. Optionally, the first CPU 103 can implement portions of the TCP/IP networking stack to help in its determination of what packets will be sent to the Ethernet and over-the-air. The first CPU 103 also controls various aspects of the radio link, potentially including the hop sequence, synchronization, and packet retries. The first CPU 103 interfaces to the first radio transceiver 104 which manages the modulation and demodulation of data, channel filtering, carrier frequency generation, and other RF functions. Different embodiments can have different functional allocations between the radio and the CPU. The first radio 104 interfaces with a first antenna 105, which couples the radio signals to the air space 111.

Accordingly, the first unit consists of an Ethernet connector 101, the first Ethernet controller 102, the first CPU 103 (or first microcontroller), the first radio 104 and the first antenna 105.

The second unit in the radio pair has an identical implementation comprising the second antenna 106 which couples signals received from the first antenna 105 to a second radio 107. The second radio 107 is controlled by the second CPU 108 which interfaces to the second Ethernet controller 109 which is connected to the Ethernet 110 such that the second unit consists of the second antenna 106, the second radio 107, the second CPU 108, the second Ethernet controller 109 and through a second Ethernet connector 101 to the second Ethernet 100.

Figure 2:
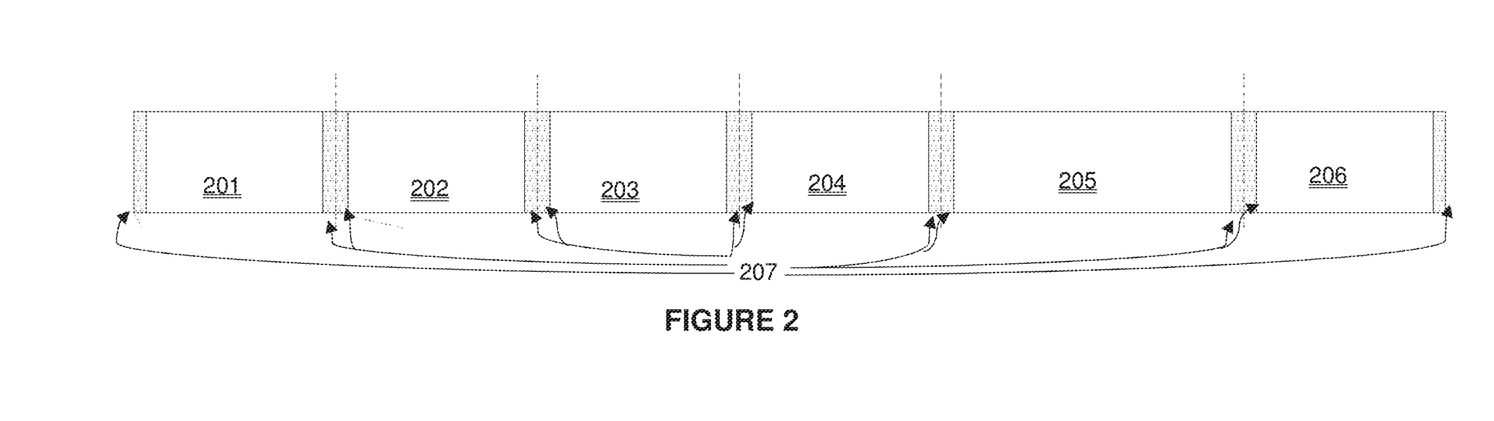
FIG. 2 is a schematic diagram showing an overall frame structure for the hop sequence of the wireless signal transmission portion of FIG. 1 showing multiple packets of data for delivery.

FIG. 2 is a schematic diagram showing an example of the hop sequence with 6 boxes drawn to represent the 50 hops. The hop sequence covers 50 channels with each hop, including guard bands 207 on the front and rear thereof, being about 400 mS in size with the entire sequence being repeated every 20 seconds. The sequence begins with the first and second radios 104, 107 being on the first channel of the sequence, referred to as Hop 0 201. When both radios 104, 107 are described as being on the first channel, this does not imply that the radios 104, 107 are transmitting or receiving on this channel, but does indicate that if the first unit needed to transmit or receive, it would do so on this channel. Typically, when a unit is not transmitting on a channel, it is in receive mode and listening, unless the power saving algorithm has the radio in a power saving mode.

Figure 3:
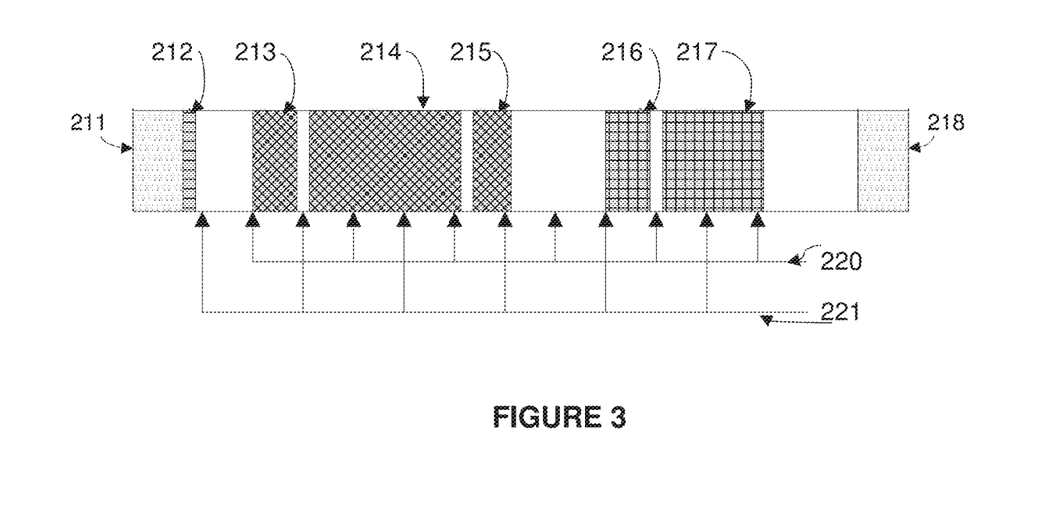
FIG. 3 is a schematic diagram illustrating an example of the components within each hop of the hop sequence of FIG. 2.

After the rear guard band 207 on Hop 0, the sequence moves to Hop 1 202, and sequentially through Hop 2 203, Hop 3 204, Hops 4-48 205, and finally through the final hop (hop 49) 206 in the sequence. FIG. 3 shows what occurs within a hop and shows an example of how packets are inserted into the hop sequence.

FIG. 3 is an illustration of the components of each hop in the hop sequence starts with a guard band 211. In the preferred embodiment the opening guard band is 1 mS, but can be longer or shorter based on implementation. A guard band 211 is necessary because there is some finite amount of time that it takes for the radio to change channels. The guard band 211 also allows for misalignment in the synchronization between radios. If the slave was slightly out of sync with the master, and the master was transmitting while the slave was still changing channel, as an example, the slave would not be able to receive that data packet. A relaxed guard band 211 allows for a looser tolerance in the sync accuracy, which eases the overall implementation.

At the end of the opening guard band 211, the master transmits a small timing packet 212. This packet 212 provides data that the slave can use for synchronization, specifically if no other packets are being transmitted in the system. The timing packet 212 consists of the unique ID of the pair and the identification of the timing packet 212 that the slave can use to adjust its time base, since it knows where in the hop sequence this timing packet 212 should be expected. Optionally, this timing packet 212 might not be transmitted if there is already significant data being sent by the master that the slave can use for timing.

In this example the timing packet 212 is followed by a series of packet start times that alternate between master start times 220 and slave start times 221. In the example in FIG. 3, the master has data to transmit and starts with a first packet 213 which is started at the master's packet start time 220 and is complete before the next slave packet start time 221. After the slave acknowledges the first packet (not shown), the system is in a mode where both sides know that the master is sending, and the master sends its next full size packet 214, which is sent immediately without waiting for the next packet start time 220, and straddles several packet start times 220. This maximum packet size is determined through system optimization, where a large packet requires longer retransmit times in the case of an error and a small packet adds a larger overhead percentage. In this example, after the full-size packet 214, the final packet 215 is transmitted. Alternately, several full-sized packets 214 can be transmitted if the Ethernet packet to send is large. This variably sized final packet 215 is sized to transfer the remaining portion of the Ethernet packet to be transmitted. Both units know the length of the entire Ethernet packet being transmitted because that information is included in the first packet 213 that was sent.

In the example of FIG. 3 the slave also has a packet to send. When the next slave packet start time 221 arrives, the slave sends the slave first packet 216, which is complete before the next master packet start time 220. In this example, the acknowledgement of the first slave packet 216 is received (not shown) and the slave continues to send the next (second) slave packet 217. This second slave packet 217 is sufficient to complete the Ethernet packet, so transmission ceases after this slave packet 217. The hop is then concluded by a second guard band 218 that then leads into the opening guard band 211 of the next hop.

Figure 4:
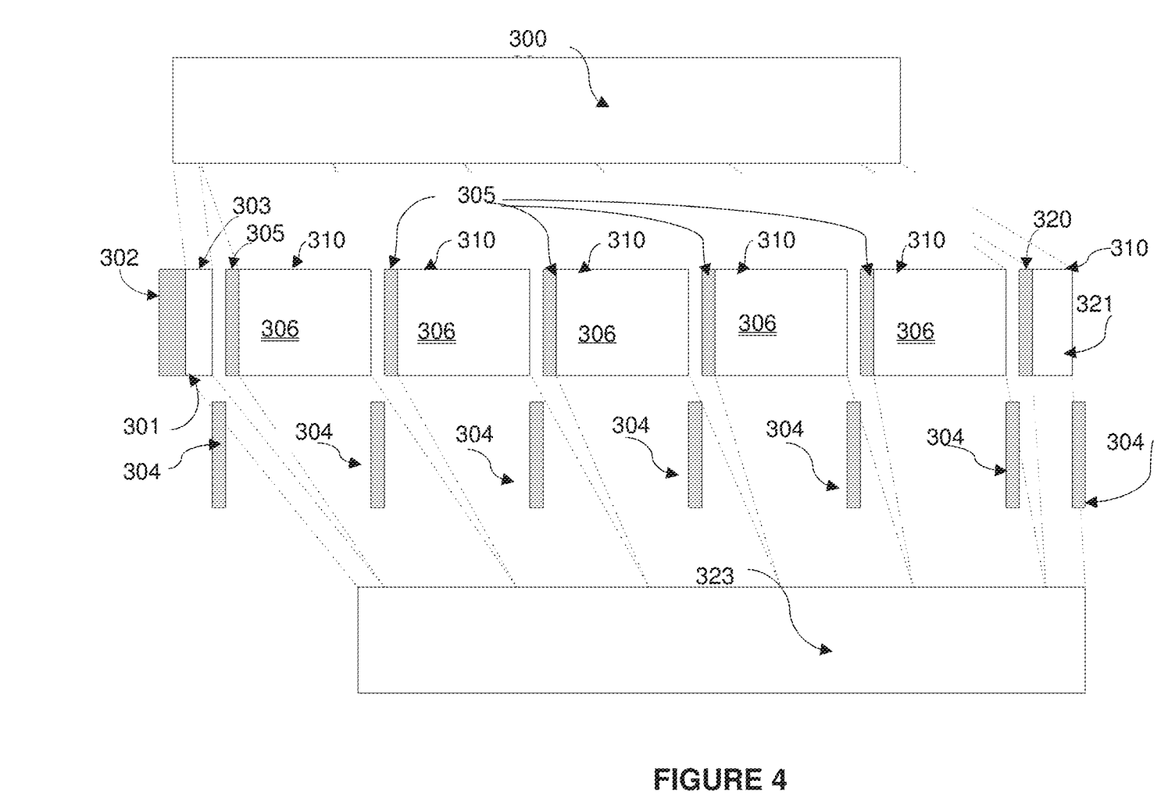
FIG. 4 illustrates a typical Ethernet data packet incorporating features of the invention broken up into smaller over-the-air (OTA) packets which are then reassembled into a complete Ethernet data packet on the receiving end.

FIG. 4 illustrates a typical Ethernet packet 300 broken up into several small OTA packets 310. The Ethernet packet 300 received by an Ethernet controller 102, 109 has an arbitrary length that can be larger than the maximum OTA packet size. During OTA transmission, a first OTA packet 301, which is smaller than other OTA packets 310 so it is complete by the next packet start time (not shown), is formed. This first OTA packet 301 is made up of a header 302 that contains the unique ID, identification from where in the hop it is being transmitted and an indication of the length of the full Ethernet packet. The remainder of the first OTA packet 301 comprises data 303 from the Ethernet packet 300.

When the first OTA packet 301 is successfully received, the receiving side sends an acknowledgement (ACK 304). Upon receiving the ACK 304, the sending side starts the next OTA packet 310 which includes a smaller header 305 which contains the unique ID and an indication that it is the next packet. This is needed because if the sender did not receive the ACK it will resend the last packet; thus, an indication is needed if this packet is a resend of the last packet or a first send of the next packet 30310. The smaller header 305 may also contain the time in the current hop, but this is optional as the system might have enough data to work on with only data 303 from the first OTA packet 301. In a preferred embodiment, the location in the current hop is not included in packets 310 that follow the first packet 301. After header 305 and data 306 for the packet 310 is sent, then the next block (the OTA Packet 310) of the Ethernet packet 300 is sent. The combination of the next OTA packet header 305 and the next OTA packet data 306 makes up a second OTA packet 310 that is limited by the maximum OTA packet size employed by the system. This packet 310 is acknowledged with a subsequent ACK 304 and then a third (next) OTA packet 310 is started with a header 305 and data 306, the receipt of which is acknowledged with a third ACK 304. Transmission continues with another packet 310 comprising a header 305, data 306 and an ACK 304; then with a next packet 310 with header 305 and data 306 and an ACK 304. A final maximum sized packet with header 306 and data is the followed with an ACK 304. A final packet 310, sized to send the remaining Ethernet packet data consists of the final header 320 and data 321, and then the final ACK 304 completing a delivered Ethernet packet 323 of the transmitted contents of the Ethernet packet 300 that comprising a small first OTA packet 301, five large OTA packets 310 and a final packet 310 across the space 111 to the second (receiving) radio 107.

Figure 5:
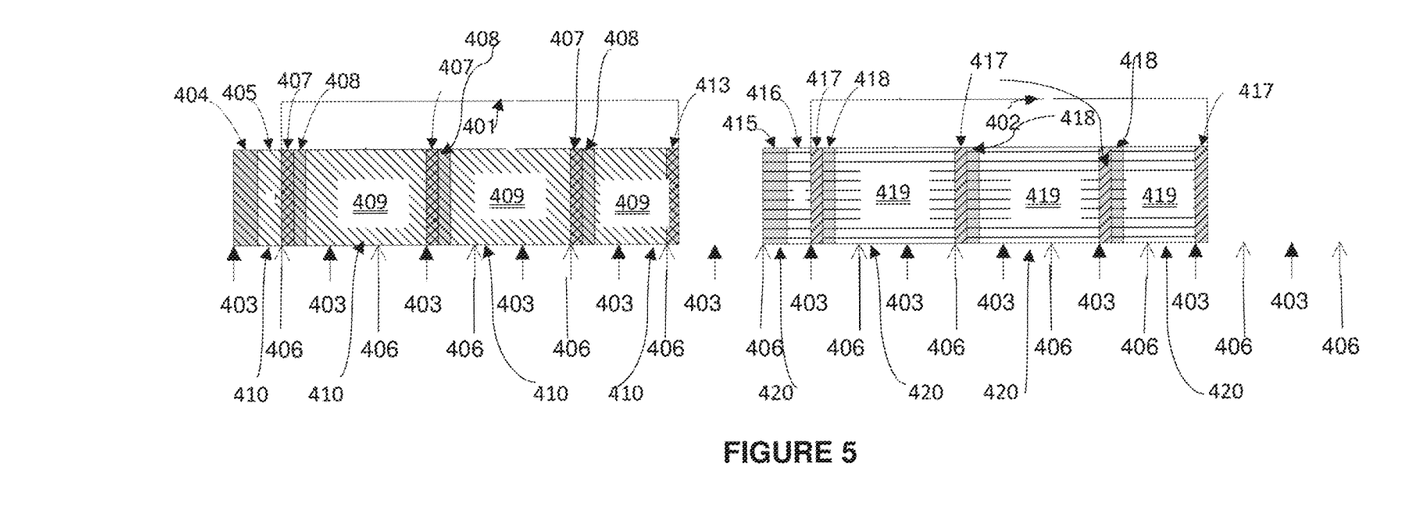
FIG. 5 schematically illustrates an example incorporating features of the invention with both sides transmitting data where no collision occurs.
Figure 6:
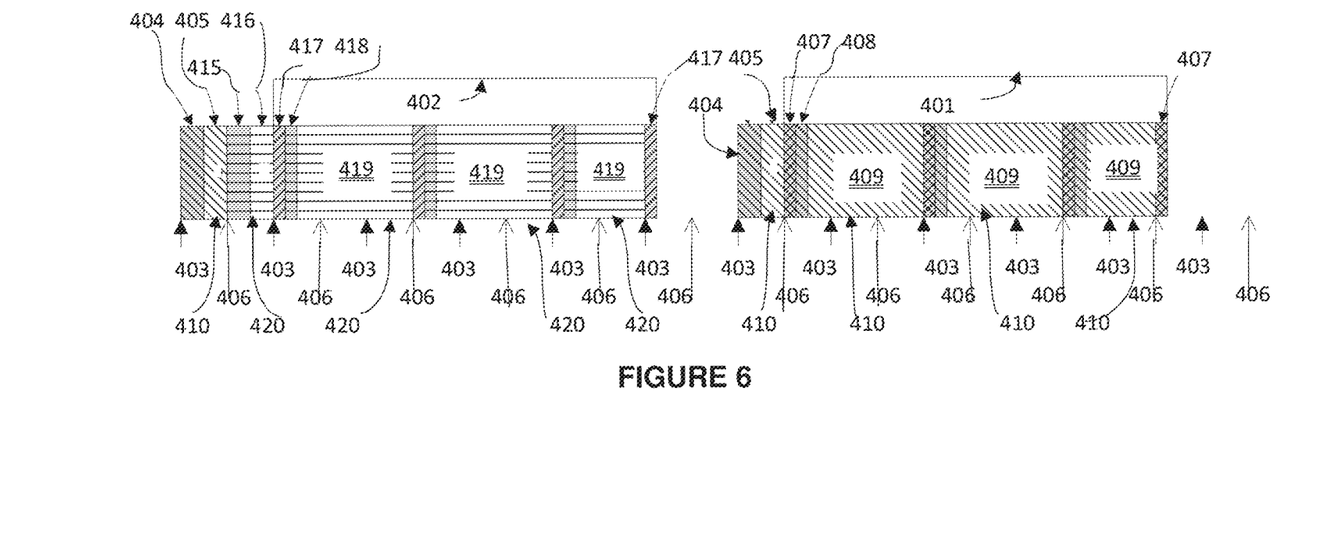
FIG. 6 schematically illustrates a first example of collision avoidance incorporating features of the invention with both sides transmitting data.
Figure 7:
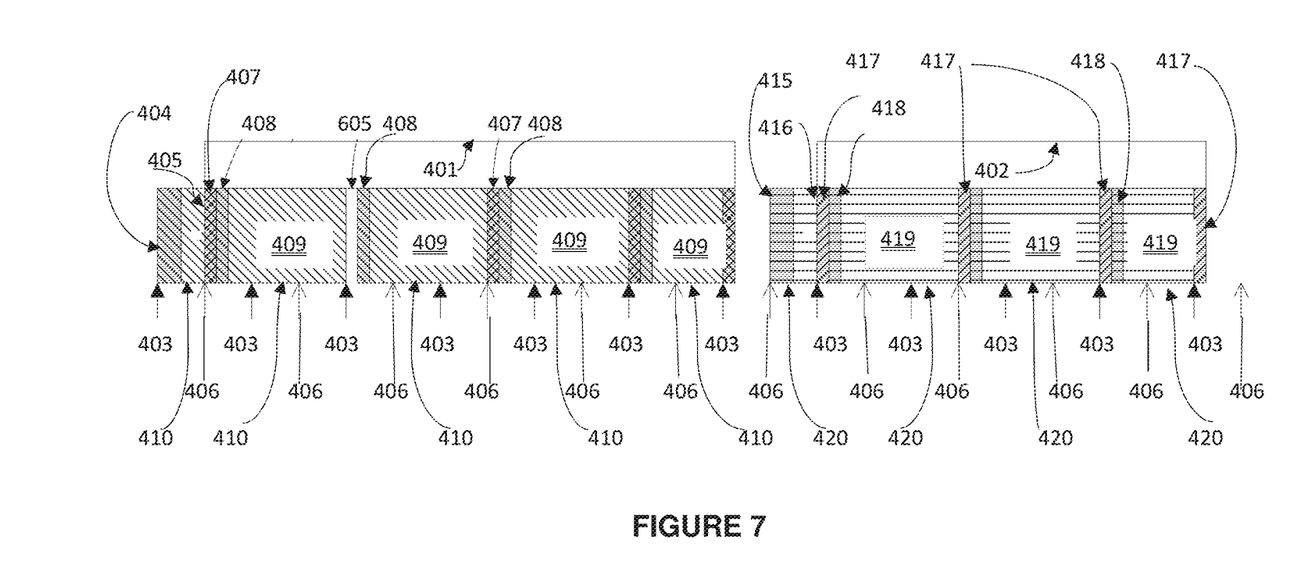
FIG. 7 schematically illustrates a second example of collision avoidance incorporating features of the invention with both sides transmitting data.

FIG. 5 illustrates an example of successful transmission of OTA packets accomplished without transmission errors or collision occurring, while FIGS. 6 and 7 illustrate two examples of transmission and collision avoidance. For the example of FIG. 5, both sides have data ready to transmit and both are waiting for their respective packet start times 403, 406 to arrive. In this scenario, the master packet start time 403 has arrived and, as described below, both the master and slave units understand that the system time is dedicated to, and has entered the time period 401 for master packet sending mode, and when complete, the system then changes, and dedicates the system to a time period 402 for the slave packet sending mode. As illustrated in FIG. 5, the system recognizes a master packet start signal 403 and a master packet 410 with first header 404 and first data 405 are sent. Upon receiving the first packet ACK 407 from the slave it is understood by both sides of the system that the system is now in the time period 401 reserved for the master packet 410 sending mode, and the system works to send the rest of the master packets 410. Following acknowledgement of the first master packet 410 consisting of a header 404 and data 405, a second of the master packets 410, consisting of a header 408 and data 409 is sent. When the master receives the ACK 407 for the second master packet 410, it immediately sends the third master packet 410, consisting of a header 408 and data 409 and receives an ACK 407. The final master packet 410, consisting of a header 408 and data 409 is sent followed by receipt of a final ACK 407, at which point the system knows that the sending of master packets 410 is complete, because the data sent across the total of the 4 packets matches the length that was identified in the first master packet header 404.

Upon completion of the master packets 410, the slave packets 420 delivery then commences. Similar to the master packet 410, the slave packets 420 comprise a first slave packet 420 sent at the next slave packet start time 406 followed by a first slave packet header 415 and the first slave packet data 416. Upon receiving the first slave packet ACK 417 it is understood by both sides of the system that the system is now in the time period 402 for the slave packets 420 sending mode, and the system works to complete sending these packets 420 before sending any other packets. In sending the slave packet 420, the first packet, consisting of a header 415 and data 416, is followed by the second packet 420, consisting of a header 418 and data 419. When the slave receives the ACK 417 for the second packet, it immediately sends the third slave packet 420, consisting of a header 418 and data 419 followed by receipt of its ACK 417. The final packet, consisting of a header 418 and data 419, is sent followed by its ACK 417, at which point the system knows that the slave sending is complete, because the data sent across the total of 4 packets matches the length that was identified in the first slave packet header 415.

In the second example, shown in FIG. 6, the master begins by sending, at the master start time 403, its first packet 410 comprising a packet header 404 and data 405, but it is not received by the slave, so the slave starts sending the first of the slave packets 420 comprising a packet header 415 and packet data 416 at the slave packet start time 406. The master receives the slave's first packet instead of an ACK, so it queues the sending of the unreceived master first packet 410 and begins receiving the packets 420 that the slave is sending. Once the master sends the ACK 417 for the first slave packet, both sides know that the system is now in the time period 402 for the slave sending mode sending a full set of slave packets 420 commencing with a second slave header 418 and data 419. The slave continues to send the complete set of packets 420 and the slave sending mode is concluded with the master sending a final ACK 417. On the next master's packet start time 403, the master again sends the first packet 410 comprising the master packet header 404 and data 405. This time the slave receives it and sends an ACK 407, and the system is in master packet 410 sending mode. The master then sends the entire set of master packets 410 continuing with a header 408 and data 409 until the last ACK 407 is received.

In the example shown in FIG. 7, the system enters the time period 401 for the master sending mode after receipt of a first ACK 407. A first master packet 410 comprising a packet header 404 and data 405 is received as indicated by the ACK 407. However, because the time period 401 for the master sending mode was entered and one of the master packets 410 comprising a packet header 408 and data 409 was sent by the master but did not make it to the slave as indicated by a non-response 605 (no ACK is sent or received) the system is still in master sending mode, the slave does not try to send any data and waits for the master to resend the failed packet. The first packet comprising the packet header 408 and data 409 is resent and received as indicated by receipt of the ACK 407, and the master sending mode is continued and concluded. The time period 402 for the slave sending mode then starts at the next slave start time 406 and continues until the time period 402 for the slave sending mode is completed.

Figure 8:
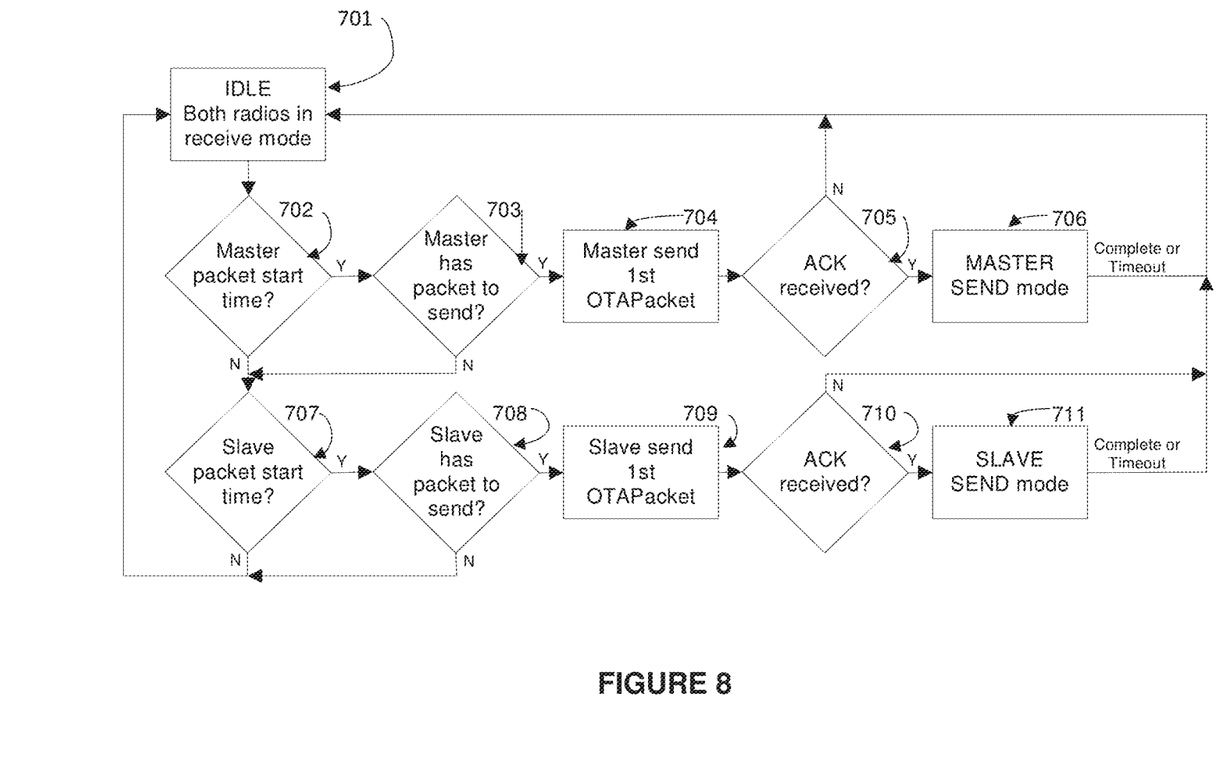
FIG. 8 shows the various steps that are part of the collision avoidance algorithm.

FIG. 8 shows a flow diagram that demonstrates the interrelationship of the master and slave sending modes. The flow diagram first starts in the idle state 701 where neither side is transmitting. In this state, both radios 104, 107 are typically in receive mode or are in deep sleep depending the state of the power saving algorithm. While in this mode, the system first checks if the master packet start time has arrived (step 702). If not, the system then checks if the slave start time has arrived (step 707). If not, the system returns to the idle mode 701.

If the first check (step 702) shows that the master packet start time has arrived then in a second step 703 the system determines whether the master has a packet of data to send. If not, it once again checks the slave start time and/or returns to the idle state 701. If the master has data to send the master sends the first packet (step 704) and waits for the ACK to arrive (Step 705). If the ACK does not arrive, the master queues the packet and returns to idle mode 701 waiting for the next packet or packet start time. If the ACK does arrive, the system enters master sending mode (Step 706) and the packets are sent until complete or the system times out. A timeout is necessary because if the master continues to try to send a packet, the slave will never get an opportunity to even try to send a packet. If the timeout fires, the packet is discarded and the system returns to idle mode 701.

If step 707 indicates the slave packet start time has been reached, step 708 determines if the slave has data to send. If not, the system returns to the idle state 701. If the slave has data to send, the slave sends the first packet (step 709) and waits for the ACK to arrive (step 710). If the ACK does not arrive, the slave queues the packet and returns to idle mode 701 waiting for the next packet or packet start time. If the ACK does arrive, the system enters slave sending mode (step 711) and the slave packet is sent until complete or the system times out. If the timeout fires, the packet is discarded and the system returns to idle mode 701.

The preceding description has been presented only to illustrate certain embodiment incorporating features of the invention. It is not intended to be exhaustive or to limit the invention to any precise form disclosed. Many modifications and variations are possible in light of the above teaching. One skilled in the art will recognize, based on the description and the examples in the FIGS. 6 and 7 that other failures to receive or to acknowledge receipt can be addressed in a similar manner.

An example of systems described herein is the Quest™ 900 MHz Ethernet/Serial Cable Replacement Module that provides a point-to-point Ethernet cable replacement. The module's serial mode replaces an RS-485 cable and works at ranges of over 6 miles. The technology employs frequency hopping and maintains synchronization at even the lowest of RF levels. The discrete PA and LNA provide efficient RF processing, while integrated and discrete filtering provide the extra signal conditioning that enhances performance. Drive an external antenna through a connector or use the unique PCB trace antennas that provide for the highest efficiencies possible using standard and cost effective FR4 materials. The processing engine has ample bandwidth to include custom communication interfaces, sensor interfaces and algorithms, or anything as well as numerous other applications and can be customized for each application. Customization parameters include data rates, transmit power, dynamic transmit power control, topology (point-to-point, star, dynamic mesh), antenna configuration, and data interface. The module can also be modified to fit into the form factor of various products.

Table 1 sets forth typical performance specifications of an OTA Ethernet transmission system incorporating features of the invention.

TABLE 1

PERFORMANCE SPECIFICATIONS

| RF PARAMETER | SPECIFICATION | NOTES |
| --- | --- | --- |
| Frequency | 902-928 MHz | |
| Output Power | 500 mW | Minimum, over all conditions |
| Range - RS485 Mode | >32,000 feet | LOS |
| Range - Ethernet Mode | >11,000 feet | LOS |
| Protocol | Customized | |
| Interference Avoidance Algorithm | Fixed-Sequence Frequency Hopping | |
| Channels | 50 | |
| Bandwidth | <500 kHz | |
| OTA Data Rate - RS485 Mode | 10 kbps | |
| OTA Data Rate - Ethernet Mode | 462 kbps | |
| Throughput - RS485 Mode | 9.6 kbps | |
| Throughput - Ethernet Mode | 100 Mbps Burst, >300 kbps Sustained | |
| Antenna | PCB, Customized | |
| FCCID | 2AHWAQTSHPWETH | |

Figure 9:
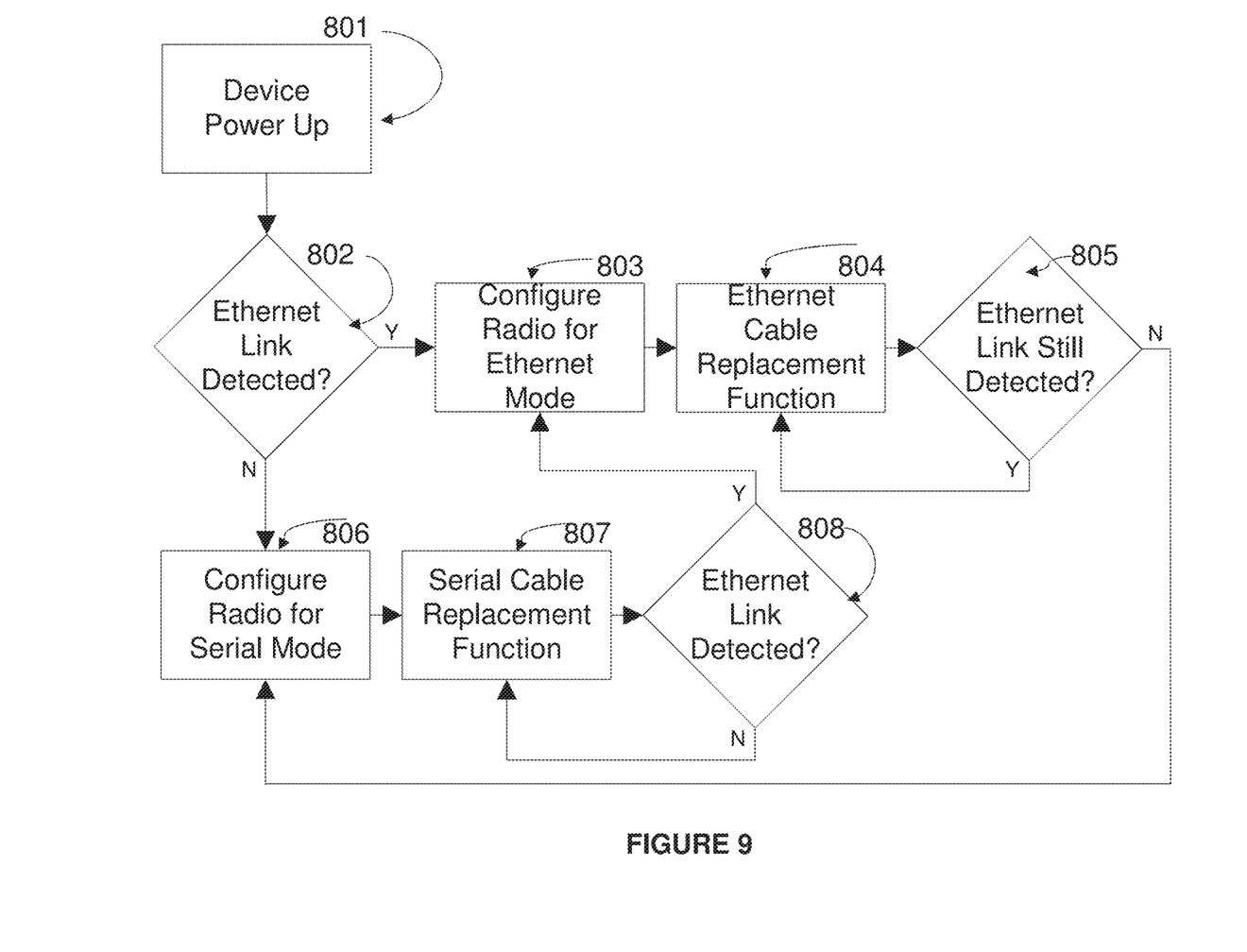
FIG. 9 is a flow diagram illustrating how the system determines whether it is connected to handle either Ethernet or RS485 serial data and then selects the appropriate supporting software.

FIG. 9 is a flow diagram illustrating how the system can be wired and configured to select and run the appropriate software to support either Ethernet or RS485 serial data delivery. The system determines whether the unit will be running in Ethernet or serial cable replacement mode. The system powers up (Step 801) and after all initializations are completed the unit looks to see if an Ethernet physical link is established (Step 802). Ethernet transceivers have as a standard function the ability to report if a physical Ethernet link is present. When the CPUs 103, 108 receive information from the Ethernet transceivers 102, 109 that there is a physical Ethernet link, the CPUs 103, 108 configure the corresponding radios 104, 107 for the data rates required for Ethernet mode (Step 803) and starts Ethernet cable replacement processing (Step 804). During this processing, the Ethernet link is checked (Step 805), and processing continues as long as the link is present. However, when the Ethernet link is no longer present, the radios 104, 107 will be configured for serial mode (Step 806), which typically includes a setup with lower data rates. The serial cable replacement processing will begin (Step 807), but the detection of an Ethernet link (Step 808) will be monitored. If an Ethernet link is detected in Step 808, the radios 104, 107 are configured for Ethernet mode settings (Step 803) and the Ethernet cable replacement processing (Step 804) is run. If, when the device is first powered up in Step 801 an Ethernet link is not detected (Step 802), the radios are directly configured for serial mode data rates (Step 806) and serial cable replacement processing begins (Step 807), with a continual checking for the existence of an Ethernet link (Step 808).

The preferred embodiment was chosen and described in order to best explain the principles of the invention and its practical application. The preceding description is intended to enable others skilled in the art to best utilize the invention in various embodiments and with various modifications as are suited to the particular use contemplated. It is intended that the scope of the invention be defined by the following claims.

We claim:

1. A system for transmitting data in a data communication network, said data communication network operating in either an Ethernet data or serial data delivery communication mode, comprising:

the system eliminating the Ethernet cable or serial cable and replacing the Ethernet cable or serial cable by an over-the-air link between a matched radio pairs, each radio in the radio pair having an antennae connected thereto, configuring one of said radios in said matched pair and the antennae connected thereto to function as a receiver and the other of said radios in said matched pair to function as a transmitter or each of said first and second radios in said matched pair configured to alternate as a transmitter and a receiver, the radios operating at frequencies between 300-3,000 MHz, the system first determining after installation if the said data communication network is operating in either an ethernet data or serial data communication mode and then configuring the system for transmitting the data at a rate suitable for said ethernet data or serial data communication mode, wherein the system comprises
  a. first and second data interfaces, and
  b. first and second controllers for delivering packets of data to CPUs connected thereto, and
  said CPUs configured for controlling the over-the-air radio link, the functioning of an antennae in communication with each radio, assembling over-the-air information packets (OTA packets), the transmission of said assembled OTA packets, and acknowledging receipt of received assembled OTA packets.

2. The system of claim 1 wherein the radios are operated in the 902-928 MHz ISM band.

3. The system of claim 2 wherein the OTA packets are transmitted by the over-the-air link are received at distances in excess of 2 miles.

4. The system of claim 1 wherein the ethernet data or serial data is divided into one or more OTA packets, said one or more OTA packets each comprising a data portion and optionally including a header portion.

5. The system of claim 1 wherein the CPUs include protocols for collision avoidance of OTA packets transmitted in an overlapping manner by the first and second radios.

6. A system for transmitting data in a data communication network, said data communication network operating in either an Ethernet data or serial data communication mode, comprising:
  the system eliminating an Ethernet cable or serial cable and replacing the Ethernet cable or serial cable by an over-the-air link between matched radio pairs, each radio in the radio pair having an antennae connected thereto, configuring one of said radios in said matched pair and the antennae connected thereto to function as a receiver and the other of said radios in said matched pair to function as a transmitter or each of said first and second radios in said matched pair configured to alternate as a transmitter and a receiver, the radios operating at frequencies between 300-3,000 MHz, the system first determining after installation if the said data communication network is operating in either an ethernet data or serial data communication mode and then configuring the system for transmitting the data at a rate suitable for said ethernet data or serial data communication mode, the system comprising
  a. first and second data interfaces, and
  b. first and second controllers for delivering packets of data to CPUs connected thereto, and
  said CPUs configured for controlling the over-the-air radio link, the functioning of an antennae in communication with each radio, assembling over-the-air information packets (OTA packets), the transmission of said assembled OTA packets, and acknowledging receipt of received assembled OTA packets, and
  wherein the CPUs include protocols for collision avoidance of OTA packets transmitted in an overlapping manner by the first and second radios, wherein the protocols for collision avoidance of transmitted OTA packets comprises establishing a set of multiple transmission start times for each of the radios, said multiple transmission start times being spaced apart according to a preset schedule, such that
  a. when a first of said radios has OTA packets of ethernet or serial data for delivery and a transmission start time for said first radio is reached, said system exits an idle mode and said first radio commences transmission of a first OTA packet, said first radio functioning in a master mode and designated as a master and a second of said radios functioning in a slave mode and designated as a slave,
  b. said slave upon receipt of said first OTA packet acknowledges receipt thereof,
  c. the master continues serially transmitting OTA packets and the slave acknowledges receipt of each OTA packet until a final OTA packet is transmitted or the full number of OTA packets set forth in the first OTA packet is reached, indicating the end of the first radio transmission,
  d. following the receipt of the final transmitted OTA packet, the slave, if it has OTA packets of data for delivery and a transmission start time for said second radio is reached, said second radio commences transmission of its first OTA packet and upon the first radio acknowledging receipt thereof the second radio is in a master mode and the first radio is in a slave mode until all of the second radio OTA packets are delivered, the system then reverting to an idle mode.

7. The system of claim 6 wherein if the first sent OTA packet is not received or not acknowledged and if the second radio has OTA packets of data for delivery and a second radio transmission start time is reached,
  a. said second radio commences transmission of its first OTA packet,
  b. if receipt of said second radio transmitted first OTA packet is acknowledged by said first radio said acknowledgment places said second radio in a master mode and the first radio in a slave mode until all of the second radio OTA packets are delivered, and
  c. the first OTA packet from the first radio not acknowledged and any OTA packets thereof for serial transmission thereafter are placed in idle mode until the next available first radio start time.

8. The system of claim 6 wherein if the first OTA packet is received and acknowledged, the first radio being a master mode, the first radio continues serial transmission of OTA packets and if an OTA packet is not acknowledged, that OTA packet not acknowledged is resent until acknowledged or until the system reaches a time out signal at which point the system goes an idle mode.

9. A system for transmitting data in a data communication network, said data communication network operating in either an Ethernet data or serial data communication mode, an Ethernet cable or serial cable being replaced by an over-the-air link between a matched radio pairs, wherein each radio in the radio pair has an antennae connected thereto, one of said radios in said matched pair and the antennae connected thereto is configured to function as a receiver and the other of said radios in said matched pair is configured to function as a transmitter, or each of said first and second radios in said matched pair are configured to alternate as a transmitter and a receiver, the radios operating at frequencies between 300-3,000 MHz, such that if the data communication network was operating in an ethernet data communication mode the system for transmitting the data is configured to transmit at a rate suitable for said ethernet data communication mode and if the data communication network was operating in a serial data communication mode the system for transmitting the data is configured to transmit at a rate suitable for said serial data communication mode, the system comprising
a. first and second data interfaces, and
b. first and second controllers for delivering packets of data to CPUs connected thereto said CPUs configured for controlling the over-the-air radio link, the functioning of an antennae in communication with each radio, assembling over-the-air information packets (OTA packets), the transmission of said assembled OTA packets, and acknowledging receipt of received assembled OTA packets.

10. The system of claim 9 wherein the radios operate in the 902-928 MHz ISM band.

11. The system of claim 10 wherein the OTA packets transmitted by the over-the-air link are received at distances in excess of 2 miles.

12. The system of claim 9 wherein the ethernet data or serial data is provided separated into one or more OTA packets, said one or more OTA packets each comprising a data portion and optionally including a header portion.

13. The system of claim 9 wherein the CPUs include protocols for collision avoidance of OTA packets transmitted in an overlapping manner by the first and second radios.

* * * * *